(12) United States Patent
Spanski et al.

(10) Patent No.: US 7,513,051 B2
(45) Date of Patent: Apr. 7, 2009

(54) LASER LINE GENERATING DEVICE WITH GRADUATED BASE

(75) Inventors: Jeffrey L. Spanski, Weddington, NC (US); John C. Smith, Denver, NC (US); Derek J. Nash, Huntersville, NC (US); Mike Williams, Mooresville, NC (US); Leslie Daily Gist, Huntersville, NC (US); Steven R. Levine, Mooresville, NC (US)

(73) Assignee: Irwin Industrial Tool Company, Huntersville, NC (US)

( * ) Notice: Subject to any disclaimer, the term of this patent is extended or adjusted under 35 U.S.C. 154(b) by 9 days.

(21) Appl. No.: 11/161,474

(22) Filed: Aug. 4, 2005

(65) Prior Publication Data

US 2005/0274030 A1 Dec. 15, 2005

Related U.S. Application Data

(63) Continuation-in-part of application No. 10/819,543, filed on Apr. 7, 2004, now abandoned, which is a continuation of application No. 10/612,035, filed on Jul. 1, 2003, now Pat. No. 7,278,218, which is a continuation of application No. 10/465,534, filed on Jun. 18, 2003, now abandoned, said application No. 10/819,543 is a continuation-in-part of application No. 10/141,392, filed on May 7, 2002, now Pat. No. 6,735,879.

(60) Provisional application No. 60/599,413, filed on Aug. 6, 2004, provisional application No. 60/291,135, filed on May 15, 2001.

(51) Int. Cl.
*G01C 15/00* (2006.01)

(52) U.S. Cl. .................. 33/286; 33/DIG. 21; 248/183.2

(58) Field of Classification Search .................. 33/286, 33/DIG. 21, 227, 281–283, 285, 354, 347, 33/376; 248/542, 683, 558, 458, 467, 130, 248/131, 425, 429, 371, 349.1, 923, 183.2
See application file for complete search history.

(56) References Cited

U.S. PATENT DOCUMENTS

| | | | | |
|---|---|---|---|---|
| 2,585,751 | A * | 2/1952 | Donnelly | 33/285 |
| 3,628,874 | A | 12/1971 | Tagnon et al. | 356/249 |
| 3,635,565 | A | 1/1972 | Colson | 33/391 |
| 3,897,637 | A | 8/1975 | Genho | 33/227 |
| 3,964,824 | A | 6/1976 | Dixon | 359/710 |
| 4,031,629 | A | 6/1977 | Paluck | 33/290 |
| 4,111,564 | A | 9/1978 | Trice, Jr. | 356/247 |
| 4,221,483 | A | 9/1980 | Rando | 356/250 |
| 4,554,590 | A * | 11/1985 | Chelin et al. | 348/827 |
| 4,751,782 | A | 6/1988 | Ammann | 33/291 |
| 4,852,265 | A | 8/1989 | Rando et al. | 33/227 |

(Continued)

OTHER PUBLICATIONS

First Office Action from Chinese Examiner for Chinese Application No. 02810031.X corresponding to U.S. Application, dated Jul. 29, 2005 (Chinese Version and English translation).

*Primary Examiner*—Amy Cohen Johnson
(74) *Attorney, Agent, or Firm*—Dennis J. Williamson; R. Brian Drozd; Moore & Van Allen, PLLC

(57) ABSTRACT

A light generating system including a base comprising a bottom surface comprising a nonmechanical attachment structure and a light generating device rotatably mounted to the base about an axis.

13 Claims, 7 Drawing Sheets

U.S. PATENT DOCUMENTS

| | | | |
|---|---|---|---|
| 4,854,704 A | 8/1989 | Funazaki et al. | 356/250 |
| 4,912,851 A | 4/1990 | Rando et al. | 33/227 |
| 4,962,907 A * | 10/1990 | Gary | 248/205.3 |
| 4,993,161 A | 2/1991 | Borkovitz | 33/291 |
| 5,012,585 A * | 5/1991 | DiMaggio | 33/286 |
| 5,063,679 A * | 11/1991 | Schwandt | 33/347 |
| 5,075,977 A | 12/1991 | Rando | 33/227 |
| 5,144,487 A | 9/1992 | Hersey | 359/629 |
| 5,178,352 A * | 1/1993 | Johnson | 248/181.2 |
| 5,208,438 A | 5/1993 | Underberg | 219/121.78 |
| 5,253,421 A * | 10/1993 | Landmark | 33/27.03 |
| 5,367,779 A | 11/1994 | Lee | |
| 5,500,524 A | 3/1996 | Rando | 250/216 |
| 5,507,464 A * | 4/1996 | Hamerski et al. | 248/683 |
| 5,539,990 A | 7/1996 | Le | 33/286 |
| 5,604,987 A * | 2/1997 | Cupp | 33/275 R |
| 5,617,202 A | 4/1997 | Rando | 356/138 |
| 5,680,208 A * | 10/1997 | Butler et al. | 356/250 |
| 5,819,424 A | 10/1998 | Ohtomo et al. | 33/290 |
| 5,864,956 A | 2/1999 | Dong | 33/227 |
| 5,907,907 A | 6/1999 | Ohtomo et al. | 33/291 |
| 6,035,540 A | 3/2000 | Wu et al. | 33/286 |
| 6,073,353 A | 6/2000 | Ohtomo et al. | 33/290 |
| 6,163,969 A * | 12/2000 | Jan et al. | 33/282 |
| 6,178,649 B1 | 1/2001 | Wu | 33/286 |
| 6,202,312 B1 | 3/2001 | Rando | 33/227 |
| 6,351,890 B1 | 3/2002 | Williams | 33/286 |
| 6,481,686 B1 * | 11/2002 | Jan | 248/349.1 |
| 6,493,955 B1 | 12/2002 | Moretti | 33/451 |
| 6,502,319 B1 | 1/2003 | Goodrich et al. | 33/286 |
| 6,568,094 B2 | 5/2003 | Wu | 33/281 |
| 6,644,616 B1 * | 11/2003 | Tsukuda | 248/371 |
| 6,735,879 B2 | 5/2004 | Malard et al. | 33/286 |
| 6,782,034 B2 * | 8/2004 | Li | 372/109 |
| 6,871,408 B2 | 3/2005 | Malard et al. | 33/286 |
| 6,914,930 B2 | 7/2005 | Raskin et al. | 371/109 |
| 6,935,034 B2 | 8/2005 | Malard et al. | 33/286 |
| 2002/0083603 A1 * | 7/2002 | Jang | 33/281 |

* cited by examiner

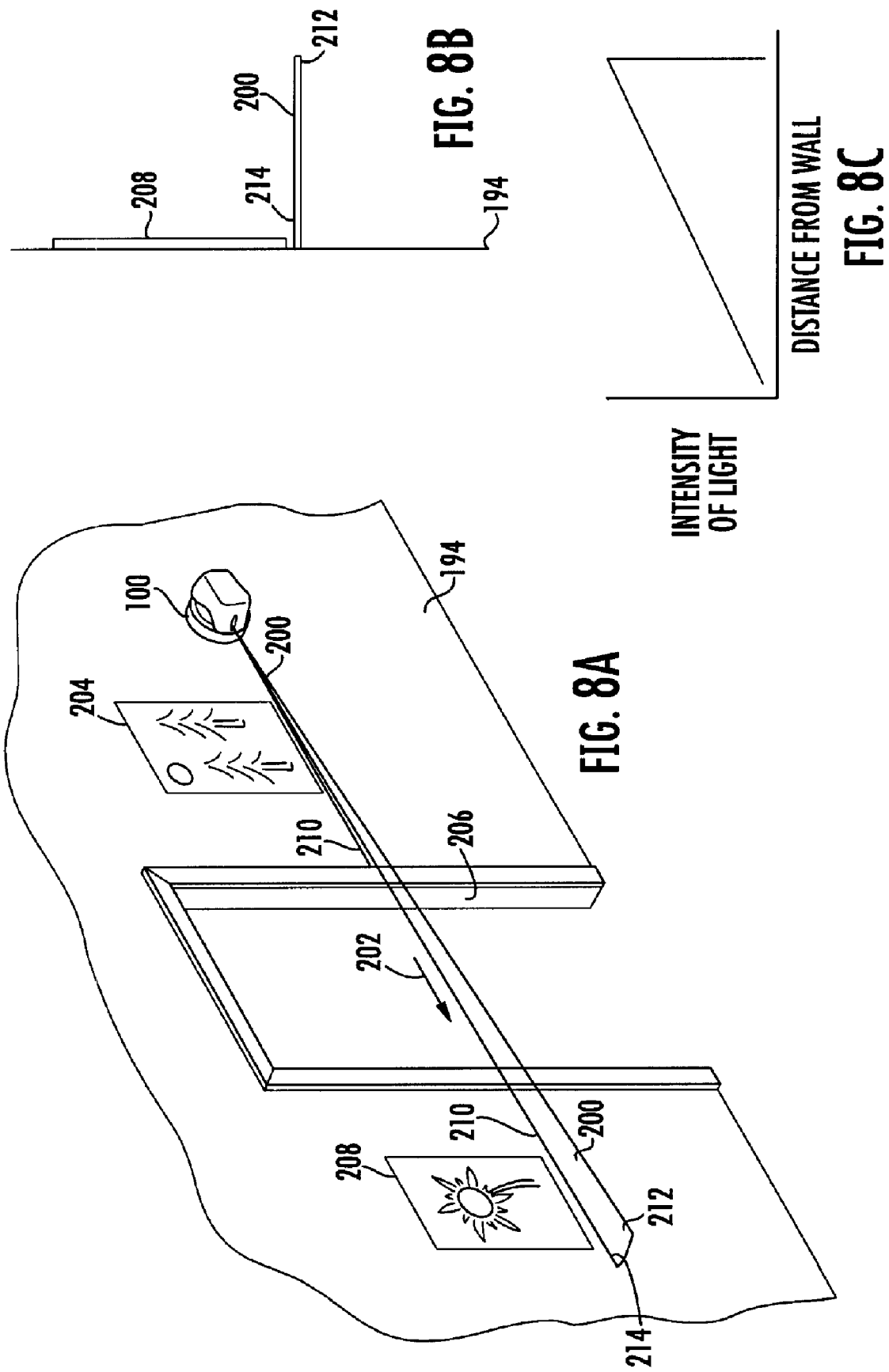

1

LASER LINE GENERATING DEVICE WITH GRADUATED BASE

This application claims priority under 35 U.S.C. § 119(e) to the filing date of U.S. Provisional Application Ser. No. 60/291,135, filed May 15, 2001, this application is also a continuation-in-part application of U.S. Pat. application Ser. No. 10/819,543, filed Apr. 7, 2004, now abandoned which claims priority under 35 U.S.C. § 119(e) to the filing date of U.S. Provisional Application Ser. No. 60/291,135, filed May 15, 2001, and which is both a continuation-in-part application of U.S. Pat. application Ser. No. 10/141,392, filed May 7, 2002, now U.S. Pat. No. 6,735,879, and a continuation application of U.S. Pat. application Ser. No. 10/612,035, filed Jul. 1, 2003, now U.S. Pat. No. 7,278,218, which is a continuation application of U.S. Pat. application Ser. No. 10/465,534, filed Jun. 18, 2003 now abandoned; and U.S. Provisional Application Ser. No. 60/599,413, filed Aug. 6, 2004; the entire contents of each of which is incorporated herein by reference.

BACKGROUND OF THE INVENTION

The technical field of the application is that of alignment devices, and in particular an alignment device and an attachment that allows the alignment device to be releasably attached from a surface on which alignment is desired.

DISCUSSION OF RELATED ART

Alignment of surfaces is a perennial problem in a variety of fields, ranging from construction to interior decorating. Alignment is necessary for walls that should be perpendicular to a floor, or otherwise plumb. Masonry and brick-laying practitioners are well aware of the importance of plumbed and aligned surfaces and chalk lines. A home interior decorated with pictures and other wall ornamentation makes a much better appearance when the ornamentation is aligned, especially with respect to vertical or horizontal alignment. Many mechanical and electrical alignment devices are available, and some laser devices are available. Some of these products are cumbersome; others are not suitable for certain uses. Chalk lines, for instance, are sometimes undesirable for use in finished, interior areas.

One aspect of alignment-product performance and in particular of laser-alignment products that could be improved is the ability to rotationally adjust the laser line.

Another disadvantage of laser-alignment products is that do not use allow the laser generating device to be attached to a variety of surfaces, including vertical walls, while allowing for flexibility in changing the rotational orientation of the laser line.

BRIEF SUMMARY OF THE INVENTION

One aspect of the present invention regards a light generating system including a base comprising a bottom surface comprising a nonmechanical attachment structure and a light generating device rotatably mounted to the base about an axis.

A second aspect of the present invention regards A light generating system including a base having a reference marking, a plurality of graduations and a stationary bottom portion, wherein the plurality of graduations move relative to the reference marking and the stationary bottom portion. A light generating device is rotatably mounted to the base about an axis, wherein the reference marking rotatably moves with the light generating device about the axis.

Each of the above aspects of the present invention provides the advantage of improving the ability to rotationally adjust the laser line.

In addition, the first aspect of the present invention provides the advantage of allowing the laser generating device to be attached to a variety of surfaces, including vertical walls, while allowing for flexibility in changing the rotational orientation of the laser line.

The following drawings form part of the present specification and are included to further demonstrate certain aspects of the present invention. The invention may be better understood by reference to one or more of these drawings in combination with the detailed description of specific embodiments presented herein.

BRIEF DESCRIPTION OF THE DRAWINGS

FIGS. 8A, 8B and 8C depict the light generating system of FIG. 1 projecting a laser beam in a narrow beam or fan and aligning objects on a wall.

DETAILED DESCRIPTION OF THE PREFERRED EMBODIMENTS

Figure 1:
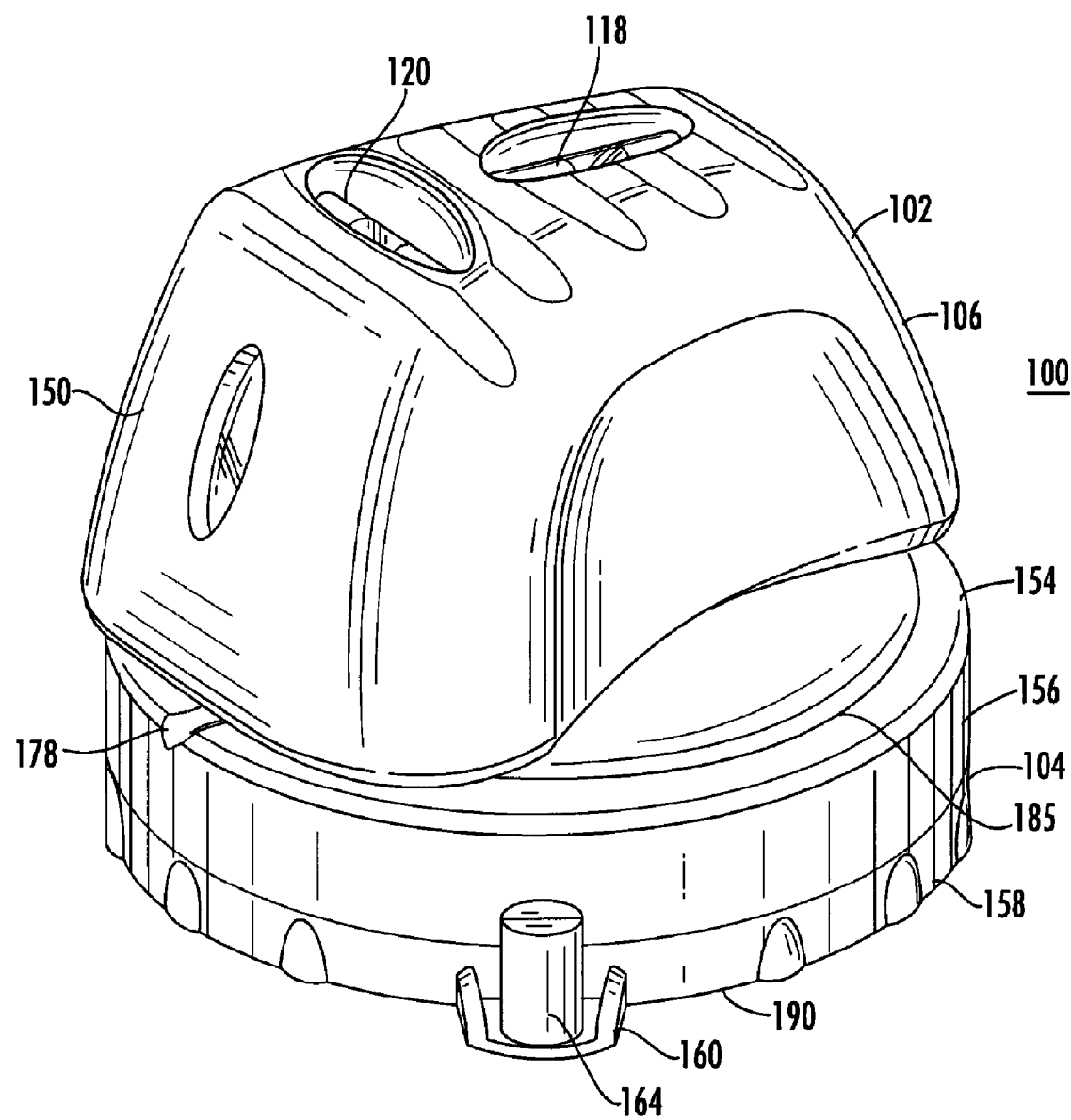
FIG. 1 is a left perspective view of an embodiment of a light generating system in accordance with the present invention.
Figure 2:
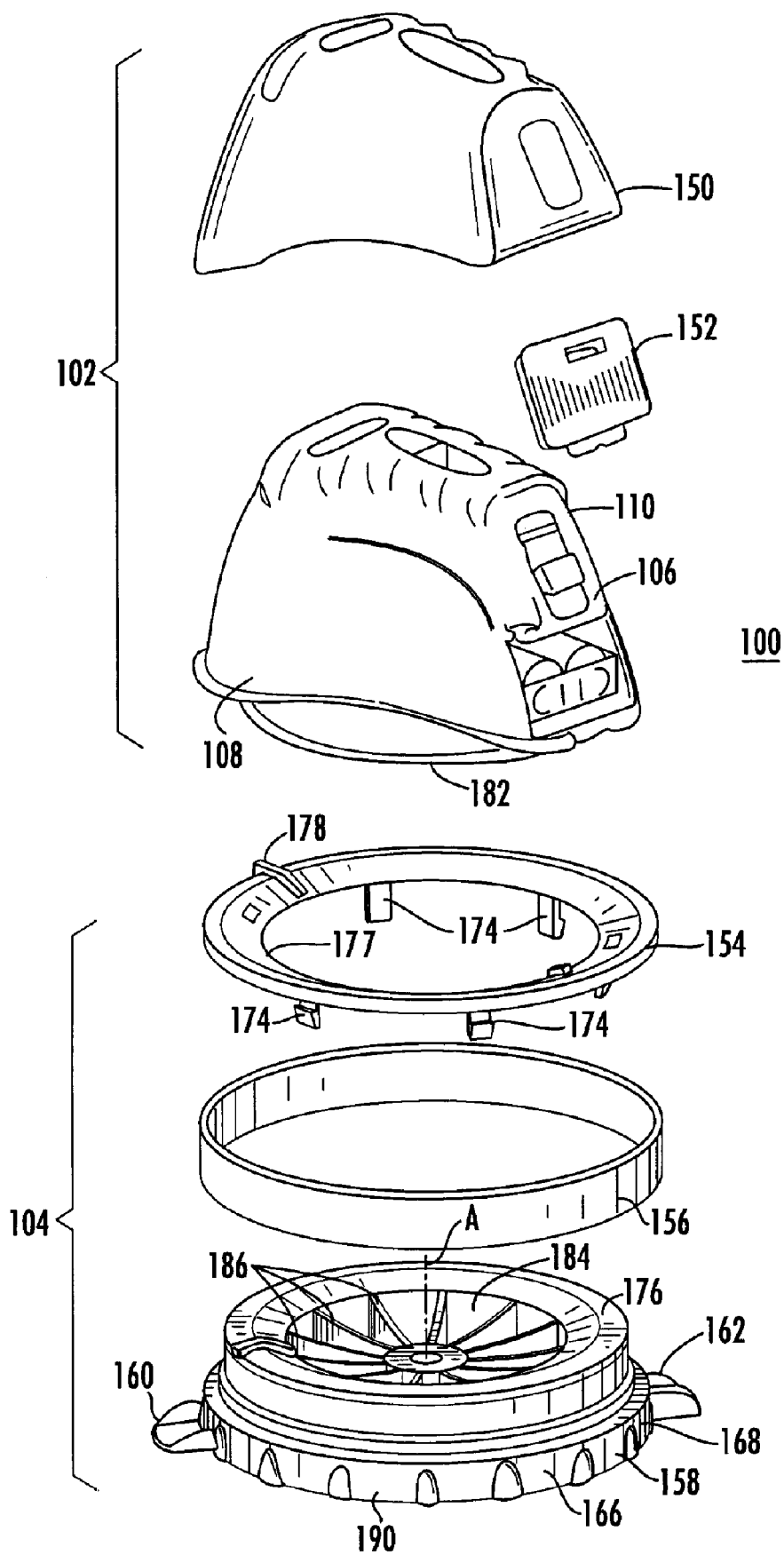
FIG. 2 is an exploded view of the light generating system of FIG. 1.
Figure 3:
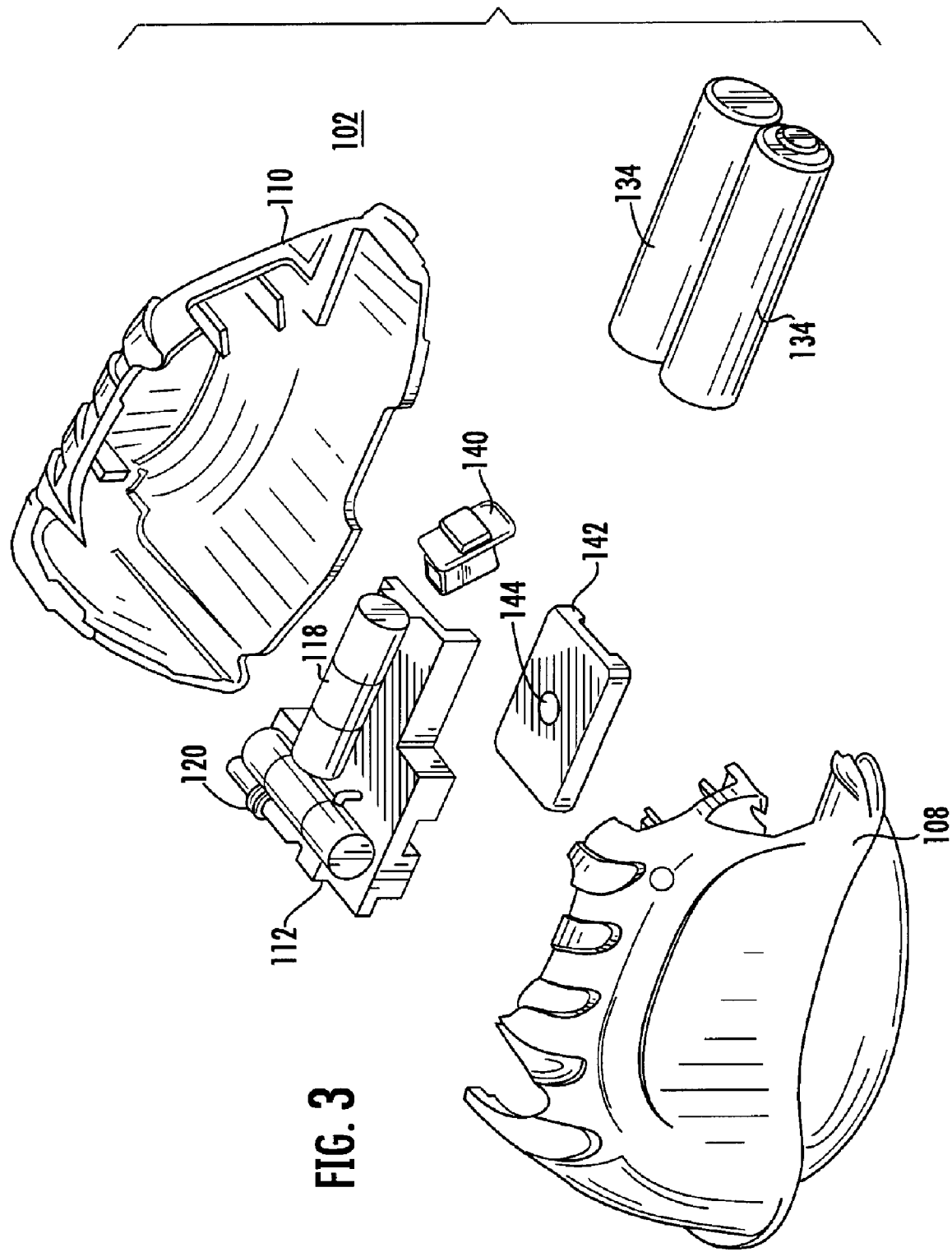
FIG. 3 is a partially exploded view of an embodiment of a light generating device to be used with the light generating system of FIG. 1 in accordance with the present invention.
Figure 4:
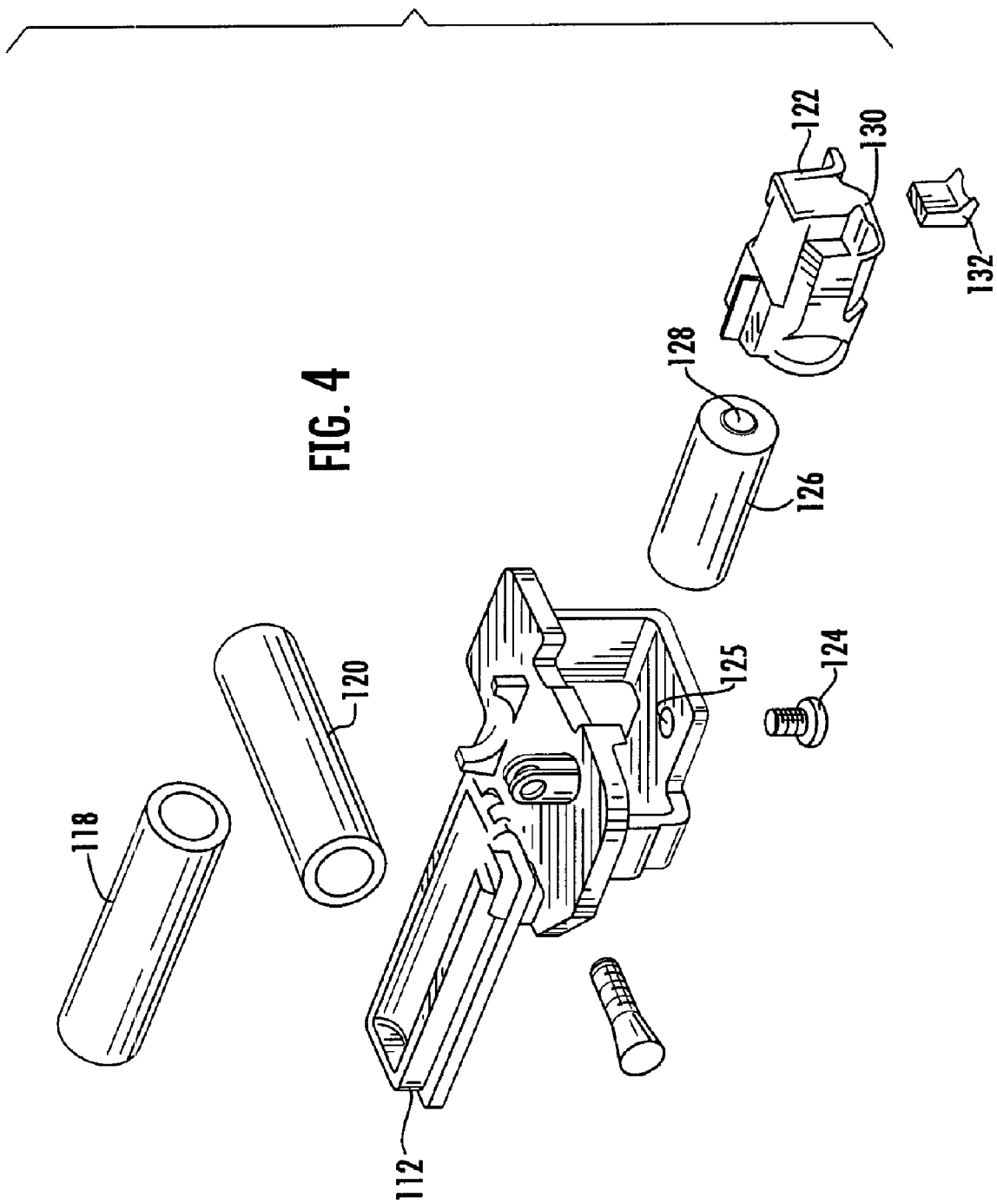
FIG. 4 is an exploded view of an embodiment of a light support to be used with the light generating system of FIG. 1 in accordance with the present invention.

The present invention is better understood by reference to the figures and description below. In particular, FIG. 1 shows a light generating system 100 that includes a light general device 102 and a base 104. As shown in FIGS. 2-4, the light generating device 102 includes a housing 106 made of a left housing shell 108 and a right housing shell 110. The shells 108 and 110 are made of a durable material, such as plastic, and are attached to one another via a snap fit and screws (not shown).

Prior to attachment of the shells 108 and 110 to one another, several components are positioned within the interior of the housing 106. For example, a laser chassis 112 made of zinc is attached to the right housing shell 110 via a screw that is inserted through opening of the laser chassis 112 and threadedly engages a threaded opening formed in the right housing shell 110. Of course, as an alternative the left housing shell 108 and the right housing shell 110 can be adapted so that the laser chassis 112 is attached to the left housing shell 108 instead of the right housing shell 100. Such attachment would be similar to that described above with respect to the attachment of the right housing shell 110. In addition, the left housing shell 108 and the right housing shell 110 can be adapted so that the laser chassis 112 is attached to both via a screw attachment similar to that described previously with respect to the right housing shell 110.

As shown in FIGS. 3 and 4, the laser chassis 112 supports two bubble vials 118, 120 that are arranged at right angles to one another. The bubble vials 118, 120 are attached to the laser chassis 112 by a mechanical attachment, such as a snap fit, or via an adhesive. Of course other attachments are possible. Besides the bubble vials 118, 120, a laser holder 122 is attached to the laser chassis 112 via a screw 124 that is inserted through opening 125 of the laser chassis 112 and engages a threaded opening (not shown) located at the bottom of the laser holder 122. The laser holder 122 defines a central cylindrical chamber into which a laser module 126 is inserted so that its exit window 128 is pointed toward an end 130 of the laser holder 122. The laser module 126 preferably contains a 635 nm light emitting laser diode. The end 130 includes an exit opening (not shown) and a frame to support a lens 132 inserted therein. The lens 132 is preferably similar to the lens described in U.S. Pat. No. 6,735,879, the entire contents of which are incorporated herein by reference. The lens 132 receives laser light emitted by the laser diode and that passes through the exit opening of the laser module 126. The effect of the lens 132 is to shape the laser light passing through it into a planar, fan-shaped "comet beam" or fan shape. The intensity of the light and the shape of the beam may be asymmetric, in which one side of the "comet" may be larger and brighter than the other side. Thus, the embodiment shown in FIG. 8B and FIG. 8C, the intensity of the laser light will be greater at outer edge 212 than at the inner edge 214 where the fan-shaped beam intersects the wall 194 while the beam is used to align object 208, such as a picture frame. FIG. 8C schematically depicts the comet effect or asymmetry of the planar fan, the Intensity of light being greater in the portion of the beam that is further away from the wall or plane of interest.

The fan shaped beam is then routed so that the less bright side of the fan-shaped beam is nearest the wall of interest, and the brighter side is away from the wall. In this orientation, the fan shaped beam of light will propagate a long distance from its origin, and the laser light will be usable a long distance away from the laser line generating device.

The laser light generated by the laser line generator preferably exits from the top, curved corner of the lens. When the beam or fan of light exits the lens, it forms a thin plane in the length-wise direction of the device. Because the light is now a plane, rather than a pinpoint, it is able to project over and beyond obstacles, allowing a user to align several objects without having to move them.

As shown in FIG. 3, the housing 106 contains a pair of batteries 134 that are confined between corresponding positive and negative terminals 136, 138 in a well known manner. The current from the batteries 134 is directed to the laser module 126, via a wire (not shown). The current is controlled by a switch 140 in a well known manner by moving the switch 140 from an "on" position to an "off" position. The switch 140 is attached to the rear portion of the housing 106.

As shown in FIG. 3, a tilt nut 142 is positioned at the bottom interior portion of the housing 106 so that its threaded opening 144 is exposed via the bottom centrally located rectangular opening (not shown in FIG. 3) defined by the housing 106. The tilt nut 142 is larger in area than the rectangular opening and is able to slide along the bottom interior surface 148 of the housing 106.

Once the housing 106 is assembled, a laser housing cover 150 is attached to the central top portion of the housing 106 as shown in FIG. 2. Similarly, a battery door 152 is removably attached to a rear portion of the housing 106 so as to enclose the batteries 134 within the housing 106. The assembled light generating device 102 is then positioned upon base 104.

Figure 6:
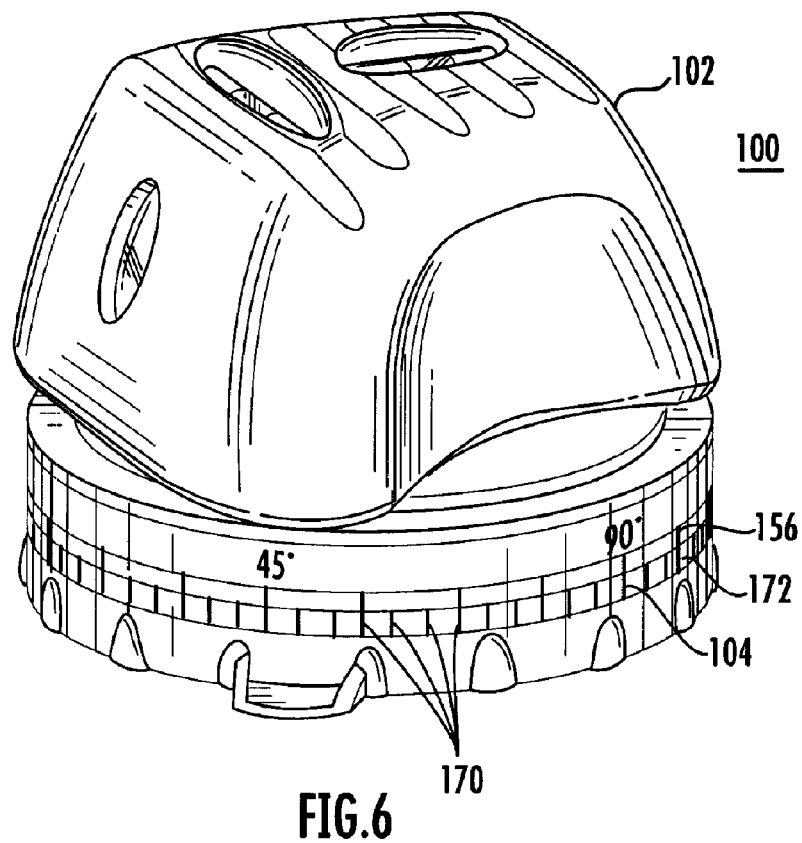
FIG. 6 is a left perspective view of the light generating system of FIG. 1 wherein the graduations on the index ring are shown.

The base 104 includes three components: 1) a top ring 154, 2) an index ring 156 and 3) a bottom support 158. As shown in FIG. 2, the bottom support 158 has a circular-like shape with flanges 160, 162 positioned opposite one another. The flanges 160, 162 each include an opening to receive a corresponding pin 164 as shown in FIG. 1. As shown in FIG. 2, the flanges 160, 162 are integrally attached to a bottom annular-like portion 166 that defines a top annular shelf 168 upon which lies the index ring 156. The index ring 156 is unattached to the bottom support 158 so that the index ring 156 can be rotated freely upon the shelf 168. As shown in FIG. 6, the index ring 156 includes equally spaced graduations or markings 170 formed on its exterior side wall 172. There are preferably 72 graduations 170 formed on the wall 172 so that the index ring 156 acts as a protractor by defining angular positions every 5 degrees, from zero degrees to 360 degrees. Note that numerical indicia, such as the sequence 0, 45, 90, 135, 180, 225, 270, 315, 360 or the sequence 0, 45, 90, 45, 0, 45, 90, 45 (FIG. 6) can be placed on the index ring 156 so as to denote the angular positions represented by one or more of the graduations. Note that other numbers of graduations are possible, such as 360 wherein the separation between adjoining graduations represents one degree of rotation.

The top ring 154 couples the light generating device 102 to the base 104. In particular, the top ring 154 includes a plurality of downwardly extending flanges 174 that are inserted within a vertical channel 176 formed in the bottom support 158. The top ring 154 defines a top annular-like surface 177 that is slanted downward and inward toward the center of the base 104. The top surface 177 also includes a vertical index marker 178 that is inserted into an index slot (not shown) formed in the housing 106 of the light generating device so that the top ring 154 engages with and rotates with the housing 106. Note that additional protrusions 180 can be formed on the top surface 177 so that they engage corresponding slots formed in the bottom surface of the laser housing 106. The index marker 178 points in the same lateral direction that the laser beam leaves the housing 106.

Figure 5:
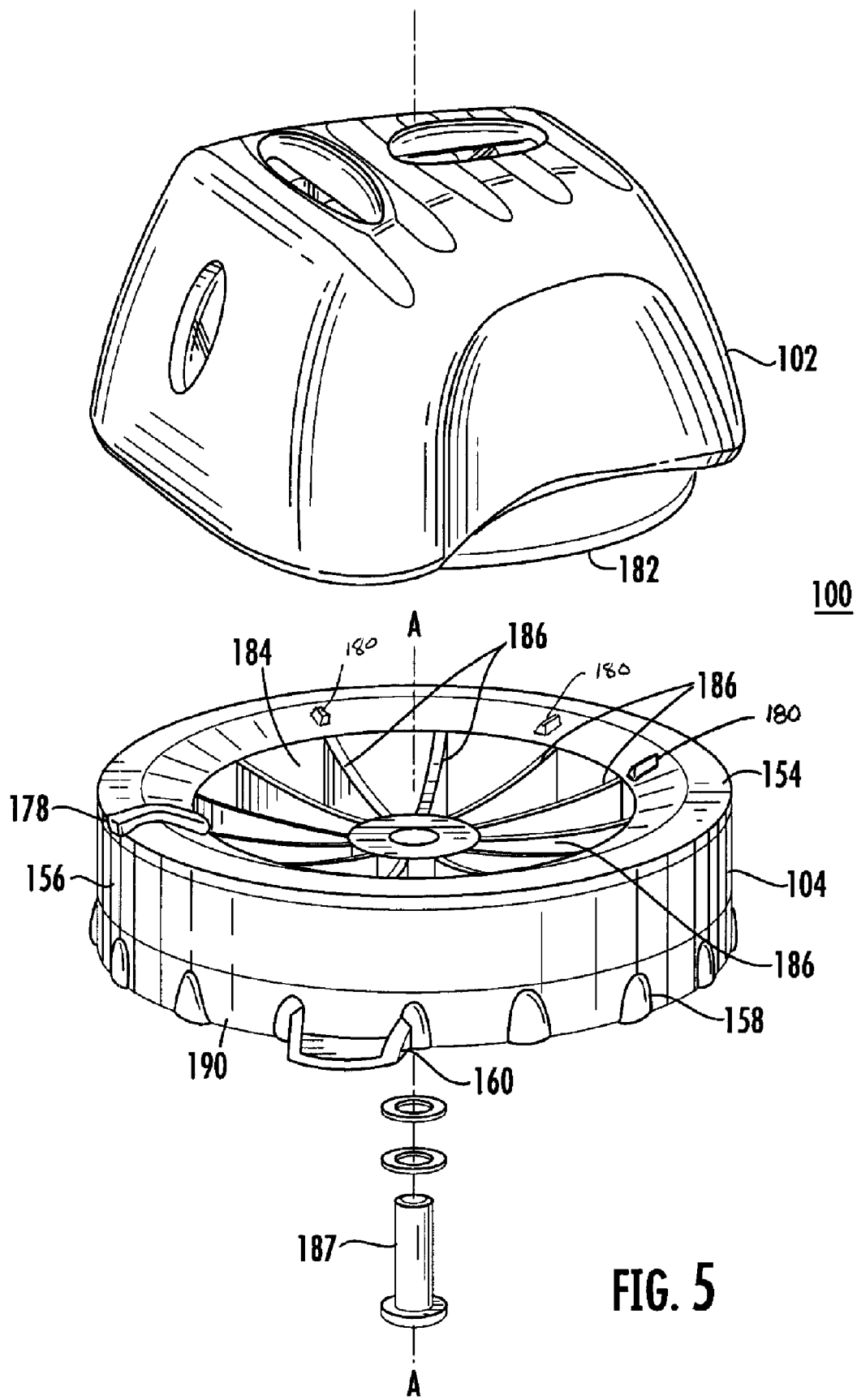
FIG. 5 is a partially exploded view of the light generating system of FIG. 1.

When assembled, the left housing shell 108 and the right housing shell 110 define a concave bottom surface 182 that lies upon a concave-like receptor surface 184 of the base 104 that includes a plurality of concave ribs 186 that are spaced apart from one another and extend radially from a center portion of the concave-like receptor surface 184. The outer portion 185 of the bottom surface 182 also lies upon the top annular-like surface 176. The bottom surface 182 preferably has a radius of curvature that substantially matches the radius of curvature of the receptor surface 184 and the top annular-like surface 176. Once the bottom surface 182 is supported on the base 104, it is slidingly attached thereto by having a screw pass 187 through the center hole 186 of the base 104 (see FIG. 5), the bottom rectangular opening (not shown) of the housing 106 and threadingly engage with the threaded opening 144 formed in the tilt nut 142. With this attachment, the housing 106 is rotatable and pivotable with respect to the base 104 so as to create a full 360° swiveling and orienting capability. The amount of swivel with respect to a plane that that is intersected at right angles by an axis A defined by the hole 186 is approximately ±4°. Note that the receptor surface 184 may be solid instead of being ribbed.

Figure 7:
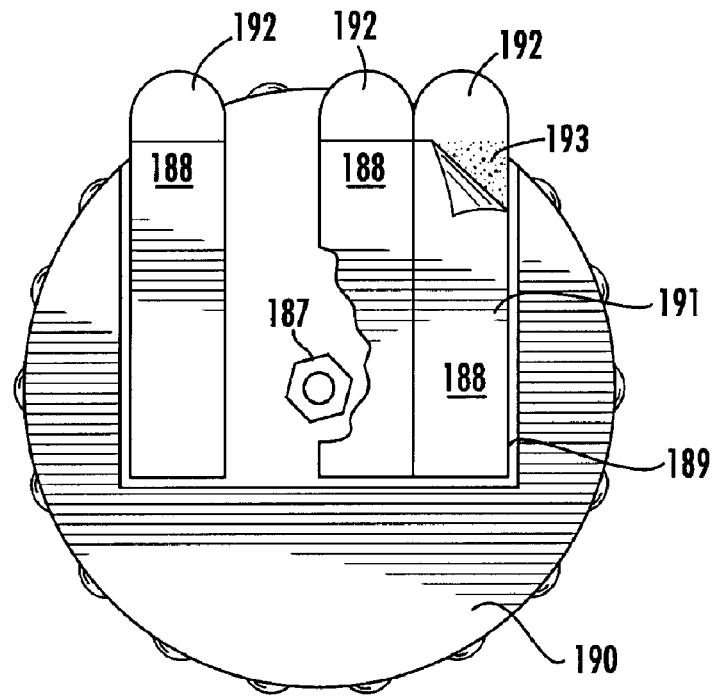
FIG. 7 is a bottom view of the light generating system of FIG. 1.

As shown in FIG. 7, one or more adhesive strips 188 are adhesively mountable in a recess 189 formed in the bottom surface 190 of the base 104, and portions thereof of release tab 192 for strip 188 may protrude from the side of the attachment. For additional support, pins 164 can be inserted into the openings of the flanges 160, 162 so that their tips penetrate the support surface as shown in FIG. 1.

In an alternative embodiment, the adhesive strip 188 can be attached to a moving plate that can be pressed to be activated.

A method of practicing the invention includes providing a surface, such as a wall, wherein orientation with a line is desired, and also providing the laser generator. A user mounts the light generating system 100 by attaching the bottom surface 190 of the base 104 onto the wall and orients the laser generator in one or more planes. Attachment is accomplished by removing a first release liner 191 from one side of a strip 188 so that an adhesive 193 is exposed. The exposed adhesive 193 is then placed so that it adhesively engages the surface on which objects are to be aligned, such as wall 194 of FIGS. 8A-8C. If removable pressure-sensitive adhesives are used, the swivel base may be removed without damaging the surface on which the objects were aligned. While many such adhesives may be used, "Command Strips," from the 3M Company, Minneapolis, Minn., are preferred. These adhesives are actually two adhesives interlocked in the center. These adhesives may be purchased, separable and aligned, for single use in adhering the base 104 to a wall or other surface. A pack of six strips may be adhered to the bottom surface of the base 104. Note that if the base 104 is attached to a vertical-like structure, there is sufficient friction present in the light generating system 100 that prevents the light generating device 102 from freely rotating relative to the base 104. Note that a similar adhesive attachment scheme is disclosed in U.S. Pat. application Ser. No. 10/819,543 ,the entire contents of which are incorporated herein by reference.

After the base 104 is attached to the surface, a reference level, such as bubble level 118, is then used to orient and true the light generating device 102 in one place, for instance, the vertical plane, using the swiveling light generating device 102 as described above. The second bubble level 120 may be used if the user wishes to orient the laser generating device 102 in a horizontal plane. When the user is satisfied that the light generating devise 102 has established a reference either being level, plumb or lined up with some external feature of the surface, the user turns on the laser generating device 102 via moving switch to the "on" position. As described in U.S. Pat. No. 6,735,879 , the entire contents of which are incorporated herein by reference, the output of the laser generating device 102 is a fan-shaped beam 200. The fan-shaped beam 200 propagates along the surface of the wall in the direction of propagation. Because the plane of the beam runs perpendicular to the wall 194 along the length of the beam, the line of intersection between the beam and the wall forms a visible line of alignment. It is also noteworthy that the axis of alignment, such as the alignment of pictures on a wall, is substantially parallel to the direction of propagation of the laser light. With the instant laser line marking device, a user projects a fan-shaped beam in a propagation direction 202 that is substantially parallel, rather than perpendicular, to the surface on which alignment is desired, the fan-shaped dimension of the beam being perpendicular to the wall. With a fan-shaped beam, the laser light is able to project over and beyond obstacles, such as moldings placed in a doorway, picture frames in the way of those being aligned on one horizontal line, or other obstacles, such as a wavy or stuccoed surface on an interior wall.

In the particular example shown in FIGS. 8A-B, the fan-shaped beam 200 is able to align a first picture frame 204 on wall 194. The beam 200 is able to overcome obstacles such as door moldings 206 with its fan shape and extend above the molding with sufficient clarity to align another object, such as picture frame 208. While the direction of propagation 202 is in the direction from the light generating system 100 to the objects on which alignment is desired, such as picture frames 204, 208, the width of the fan is perpendicular to the wall 194. The fan-shaped beam 200 intersects the wall 194 and the light is visible on the wall at the intersection 210 of the fan-shaped beam 200 with the wall 194.

Once the beam is generated it establishes a reference position or direction. From this reference position, the angular position of the beam can be altered in a precise manner. For example, the graduation on the index ring corresponding to the reference position is first recorded and the light generating device 102 and marker 178 are rotated, while index ring 156 remains stationary, until the beam travels a desired angular position relative to the graduation corresponding to the reference position. For example, if the reference position corresponds to the 20° graduation and it is desired to move the beam 40° from the reference position, the light generating device 102 is rotated so that the marker 178 is aligned with either the 60° or the 340° graduation, depending on the desired direction of the beam.

In an alternative aligning procedure, once the beam is generated and establishes a reference position or direction in the manner described above, the index ring 156 is rotated until a reference graduation, such as the 0° graduation, is aligned with the beam and the marker 178. In the case of the 0° graduation being the reference graduation, if it is desired to move the beam α degrees from the reference position, the light generating device 102 is rotated until the marker 178 is aligned with either the α degree graduation or the (360°-α°) graduation, depending on the desired direction of the beam. When the 0° graduation is the reference graduation there obviously is less need for calculating the graduation to which the light generating device 102 is rotated.

When the user has completed the alignment task, the user pulls on the release tabs 192, releasing the adhesive 193 from wall 194 or other surface. The adhesive strip that was used may then be removed from bottom surface 190 of the base 104. The user may then go on to other alignment tasks as desired.

While this invention has been shown and described in connection with the preferred embodiments, it is apparent that certain changes and modifications, in addition to those mentioned above, may be made from the basic features of this invention. While the laser line generator may be most convenient to use when mounted to a wall, it may also be mounted on a table, floor, or other flat surface, and used to project a line without being mounted on a wall. Many other variations of the invention may also be used without departing from the principles outlined above. For example, multiple laser beams could be generated orthogonally to one another. Accordingly, it is the intention of the applicant to protect all variations and modifications within the valid scope of the present invention. It is intended that the invention be defined by the following claims, including all equivalents.

What is claimed is:

1. A light generating system, comprising:
    a base comprising:
        a bottom surface having a removable adhesive for attaching the base directly to a vertical surface, said removable adhesive comprising at least one strip and said removable adhesive configured to be removable from said vertical surface without damaging said vertical surface;
        an index marker;
        a plurality of graduations; and
        a stationary bottom portion, wherein said plurality of graduations move relative to said index marker and said stationary bottom portion; and a light generating device rotatably mounted to said base about a first axis said light generating device generating a planar fan shaped beam of light such that said beam of light intersects said surface to create a line of light on said vertical surface, wherein said index marker rotatably moves with said light generating device about said first axis such that the angle of said line of light can be changed on said surface.

2. The light generating system of claim 1, wherein said plurality of graduations are formed on an annular ring and said reference marking is formed on a top ring that is positioned above said annular ring.

3. The light generating system of claim 2, wherein said annular ring rotates about said first axis.

4. The light generating system of claim 2, wherein said top ring is attached to said light generating device so that said top ring rotates with said light generating device about said first axis.

5. The light generating system of claim 1, wherein said base comprises a concave-like receptor surface upon which a support surface of said light generating device is positioned.

6. The light generating system of claim 1, wherein said light generating device tilts about a second axis that is perpendicular to said first axis.

7. The light generating system of claim 1, wherein said light generating device generates a laser beam with an asymmetric intensity.

8. The light generating system of claim 1, wherein said light generating device generates light in the shape of a fan and the bottom surface lies in a first plane and the fan substantially lies within a second plane that intersects the first plane.

9. The light generating system of claim 1, wherein said removable adhesive is removable pressure-sensitive adhesive and said removable pressure-sensitive adhesive comprises a plurality of strips secured to said bottom surface.

10. A light generating system, comprising:
a base comprising:
 a bottom surface having a removable adhesive for attaching the base to a vertical surface;
 an index marker;
 a plurality of graduations; and
 a stationary bottom portion, wherein said plurality of graduations move relative to said index marker and said stationary bottom portion; and
a light generating device rotatably mounted to said base about a first axis said light generating device generating a planar fan shaped beam of light such that said beam of light intersects said surface to create a line of light on said vertical surface, wherein said index marker rotatably moves with said light generating device about said first axis such that the angle of said line of light can be changed on said surface;
wherein said base further comprises a concave-like receptor surface upon which a support surface of said light generating device is positioned; and
wherein said concave-like receptor surface comprises a plurality of concave ribs that are spaced apart from one another and extend radially from a center portion of said concave-like receptor surface.

11. The light generating system of claim 10, wherein said support surface is convex-like in shape.

12. A light generating system, comprising:
a base comprising a bottom surface, an index marker, a plurality of graduations, and a stationary bottom portion, wherein said plurality of graduations move relative to said index marker and said stationary bottom portion;
a removable adhesive for attaching the base to a vertical surface, said removable adhesive comprises removable pressure-sensitive adhesive that comprises a plurality of strips; and
a light generating device rotatably mounted to the base about an axis, said laser light generating device generating a planar fan shaped beam of light and, wherein said axis is aligned perpendicular to said vertical surface.

13. The light generating system of claim 9, wherein said base comprises a concave-like receptor surface upon which a support surface of said light generating device is positioned, wherein said concave-like receptor surface comprises a plurality of concave ribs that are spaced apart from one another and extend radially from a center portion of said concave-like receptor surface, and wherein said support surface is convex-like in shape.

* * * * *